No. 759,295. PATENTED MAY 10, 1904.
T. S. MILLER.
CONVEYING APPARATUS.
APPLICATION FILED JUNE 18, 1898.
NO MODEL. 7 SHEETS—SHEET 1.

WITNESSES.
INVENTOR

No. 759,295. PATENTED MAY 10, 1904.
T. S. MILLER.
CONVEYING APPARATUS.
APPLICATION FILED JUNE 18, 1898.
NO MODEL. 7 SHEETS—SHEET 2.

FIG. 3.

WITNESSES.
INVENTOR
ATTORNEYS.

No. 759,295. PATENTED MAY 10, 1904.
T. S. MILLER.
CONVEYING APPARATUS.
APPLICATION FILED JUNE 18, 1898.
NO MODEL. 7 SHEETS—SHEET 3.

No. 759,295. PATENTED MAY 10, 1904.
T. S. MILLER.
CONVEYING APPARATUS.
APPLICATION FILED JUNE 18, 1898.
NO MODEL. 7 SHEETS—SHEET 4.

No. 759,295. PATENTED MAY 10, 1904.
T. S. MILLER.
CONVEYING APPARATUS.
APPLICATION FILED JUNE 18, 1898.
NO MODEL. 7 SHEETS—SHEET 5.

WITNESSES.
Ernest Pulsford.
C. J. Rathjen.

INVENTOR
Thomas Spencer Miller
by Gifford & Bull.
ATTORNEYS

No. 759,295. PATENTED MAY 10, 1904.
T. S. MILLER.
CONVEYING APPARATUS.
APPLICATION FILED JUNE 18, 1898.
NO MODEL. 7 SHEETS—SHEET 6.

WITNESSES.
Ernest Pulsford
C. J. Rathjen

INVENTOR
Thomas Spencer Miller
by Tiffany & Bull
ATTORNEYS.

No. 759,295. PATENTED MAY 10, 1904.
T. S. MILLER.
CONVEYING APPARATUS.
APPLICATION FILED JUNE 18, 1898.
NO MODEL. 7 SHEETS—SHEET 7.

No. 759,295. Patented May 10, 1904.

UNITED STATES PATENT OFFICE.

THOMAS SPENCER MILLER, OF SOUTH ORANGE, NEW JERSEY.

CONVEYING APPARATUS.

SPECIFICATION forming part of Letters Patent No. 759,295, dated May 10, 1904.

Application filed June 18, 1898. Serial No. 683,843. (No model.)

*To all whom it may concern:*

Be it known that I, THOMAS SPENCER MILLER, of South Orange, Essex county, State of New Jersey, have invented a new and useful Improvement in Cableways, of which the following is a specification.

Certain parts of the principles of my invention are applicable to cableways in general; but in the following description I have shown them as embodied in an apparatus for transporting loads between a collier and a battle-ship at sea, and in which, therefore, the supports for the apparatus have a motion relatively to and from each other, produced by the waves.

Figure 1:
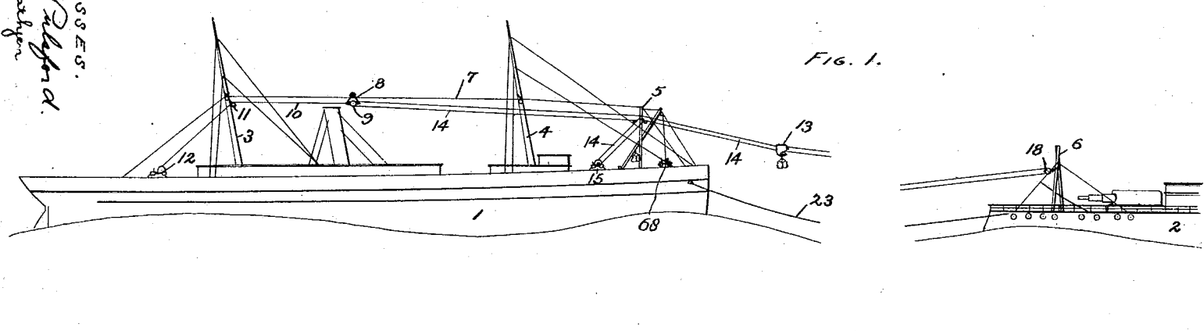
Figure 1 shows the collier and a portion of the battle-ship with the conveying apparatus, a section of the conveying-ropes and tow-line being omitted.
Figure 2:
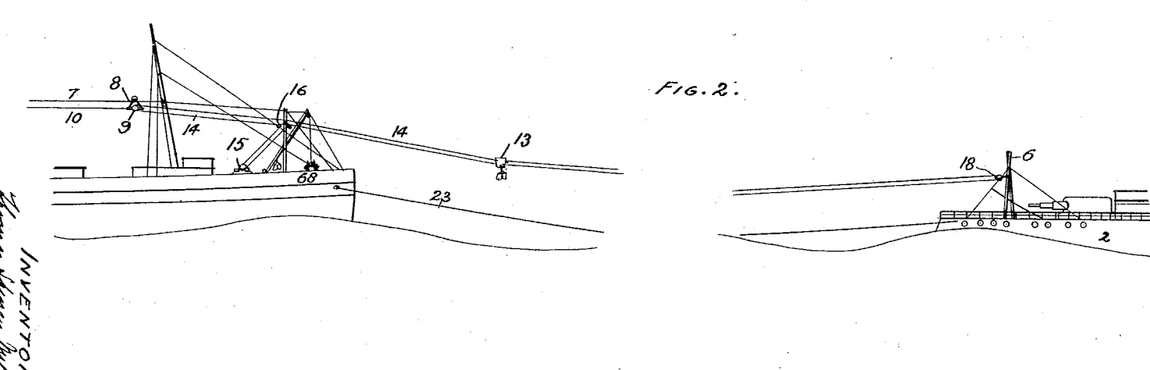
Fig. 2 represents a portion of the same, but with the two vessels carried farther apart by the motion of the waves.
Figure 3:
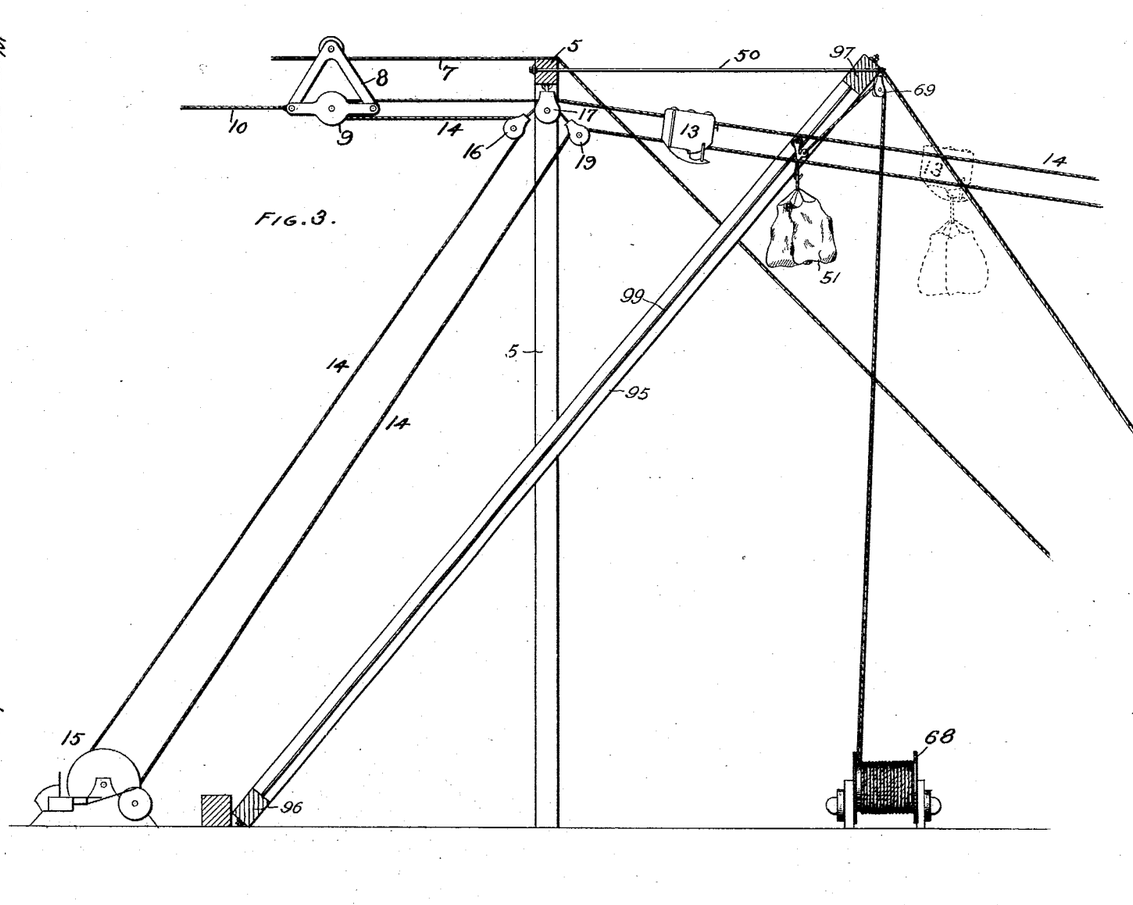
Fig. 3 shows in detail the apparatus employed for hoisting the load on the collier and starting its conveyance to the battle-ship.
Figures 4, 5, 6:
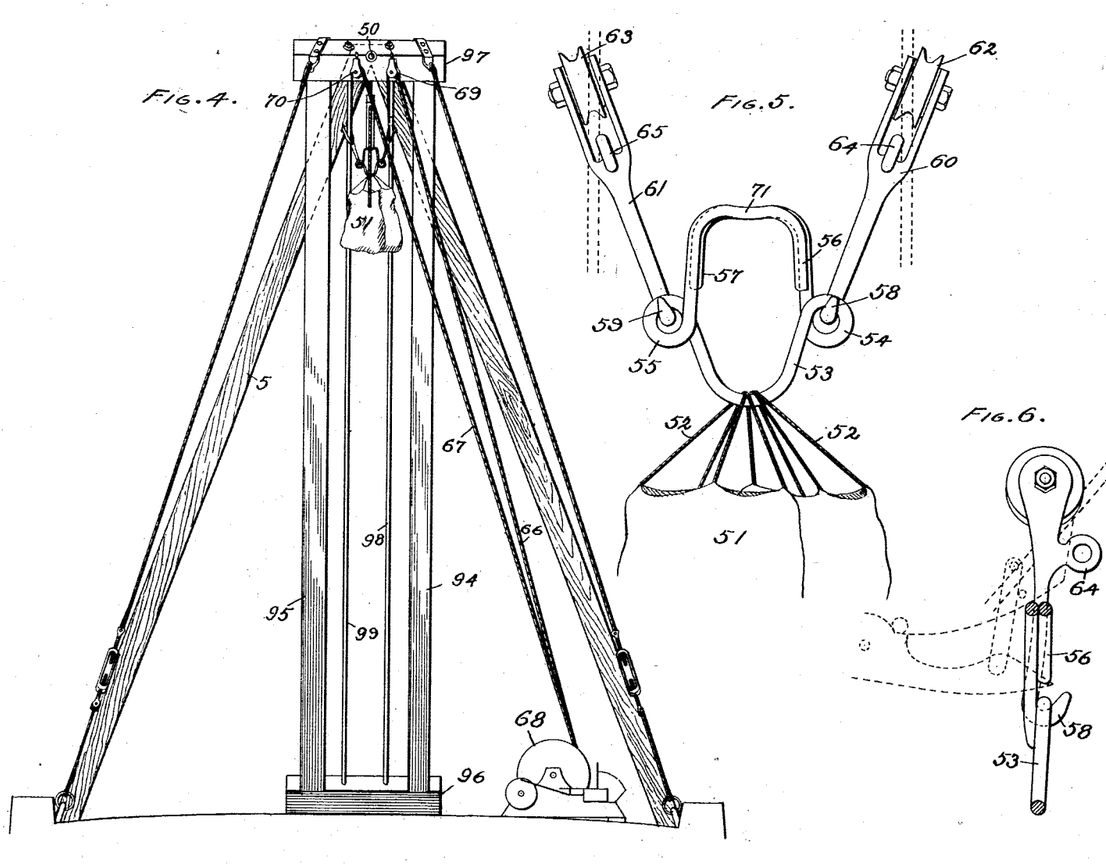
Figs. 4, 5, and 6 are details of the apparatus for hoisting the load on the collier.
Figure 7:
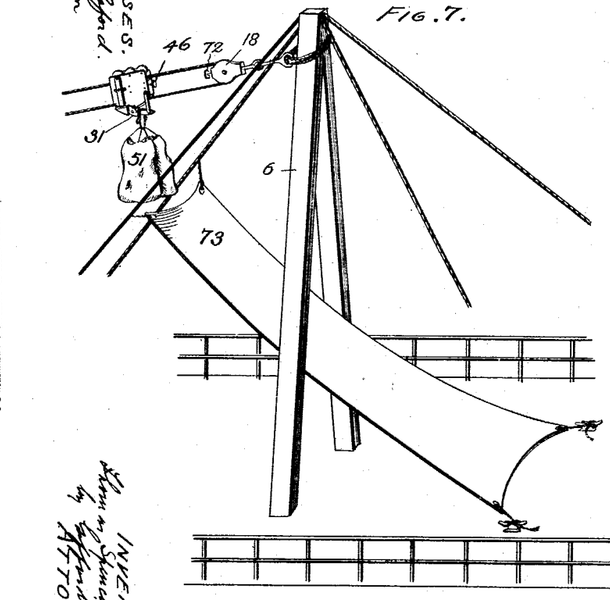
Figs. 7 and 8 are details of the means for receiving the load on the battle-ship, the same being shown in two positions.

1 is the collier; 2, the battle-ship; 3 and 4, the masts of the collier; 5, an upright on the collier; 6, an upright on the battle-ship; 7, a fixed cable or trackway extending between the masts 3 4 and the upright 5, upon which cable travels a carriage 8, supporting the sheave 9.

10 is a rope one end of which is fixed to the carriage 8 and which passes over the sheave 11 and is fastened at its opposite end to the drum of the rope-drum engine 12, which drum acts as a take-up, maintaining the rope 10 under substantially a constant tension.

14 is a rope that is wrapped around the drum of rope-drum engine 15, located on the deck of the collier, and extends thence upward and around the sheave 16, attached at an elevation to the upright 5, thence around the tension-sheave 9, mounted upon the tension-sheave-supporting carriage 8, thence horizontally over the sheave 17 at an elevation on the upright 5, thence around the sheave 18, supported at an elevation on the upright 6 of the battle-ship, thence back again over the sheave 19, supported at an elevation on the upright 5, thence downward to its already-mentioned coil around the said drum of the rope-drum engine 15. The rope 14 may be either endless by having its ends fastened together or by having its ends fastened to the drum. In going and coming to and from the battle-ship the rope 14 engages with the load-supporting carriage 13. The upper portion of the rope acts as a track for the wheels 20, 21, and 22 to run on. The lower portion of the rope 14 in passing through the carriage 13 makes a yielding connection with the carriage 13, which connection is sufficiently positive to cause the carriage 13 under normal conditions to travel to or from the battle-ship, but is not so positive as to prevent the lower portion of the rope 14 from slipping through the carriage upon the travel of the carriage being arrested or abnormally opposed or upon the travel of the rope 14 being abnormally accelerated. A mechanism by which this may be accomplished will be hereinafter more particularly described.

Figure 10:
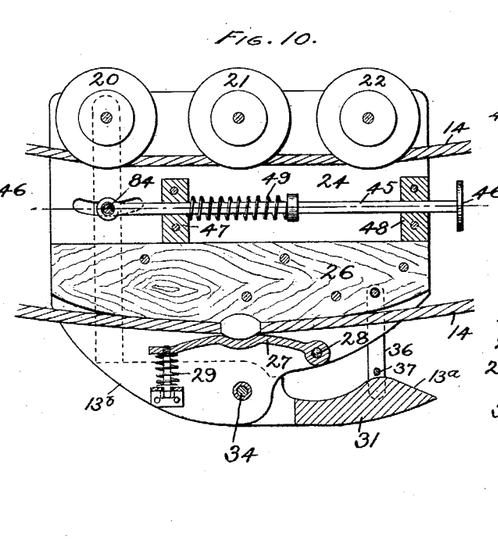
Figure 11:
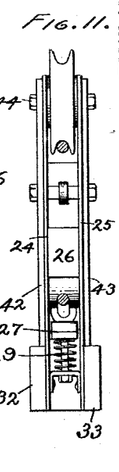
Figure 13:
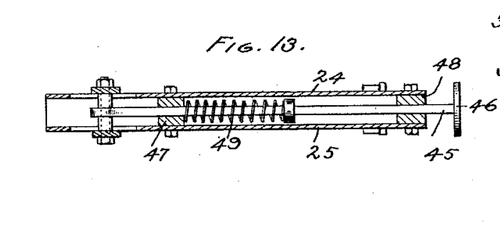
Figure 14:
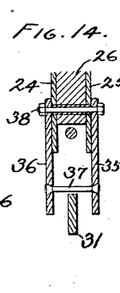

23 is a tow-line connecting the stern of the battle-ship with the bow of the collier. The load-conveying carriage 13 consists of the side plates 24 and 25, carrying between them the axles for the wheels 20, 21, and 22, also the timber 26, also a clutch consisting of the arm 27, pivoted at 28 and pressed toward the timber 26 by the spring 29. The rope 14 is clutched between the timber 26 and the arm 27. Ordinary friction may be relied upon for making this clutch sufficiently positive, or, if preferred, buttons, as 30, may be mounted at intervals upon the rope 14, and the clutching-surfaces of the timber 26 and the arm 27 may, as shown in Fig. 10, be sufficiently hollow at one point to receive and hold the button at that point more positively than would the clutch acting upon the rope without the button.

31 is the hook for supporting the load. This hook projects from the two plates 32 and 33, which are pivoted on the stud 34, one on the outside of plate 24 and the other on the outside of plate 25.

35, 36, and 37 are the side pieces and crosspiece, respectively, of a link pivotally suspended from the frame, so that when hanging vertically this link closes the mouth of the hook 31.

38 is a stop on the frame whereby the link is prevented from swinging forward, although it is free to swing backward.

Figures 9, 12:
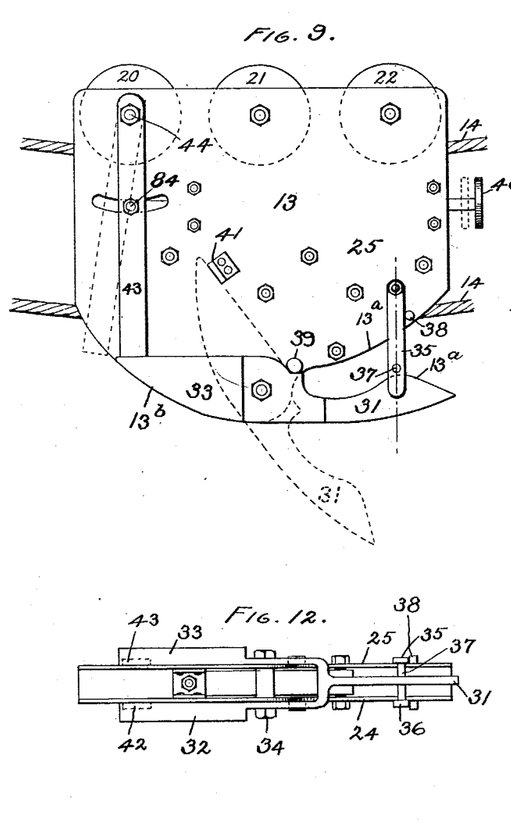
Figs. 9 to 14, inclusive, are details of the load-conveying carriage, which is numbered 13 in Figs. 1 and 2.

39 is a stop on the frame whereby the hook is prevented from swinging upward beyond the position shown in Fig. 9; but the hook may when not otherwise held swing downward until its rearward projections 32 and 33 strike against the stop 41, as shown by dotted lines in Fig. 9. The projections 32 and 33 are heavier than the hook 31, so that their weight overbalances that of the hook 31 and holds the hook normally in its upward position, as shown in full lines in Fig. 9, when the hook is not loaded. When the hook is carrying a load, it is held in its horizontal position by a latch, which may consist of the arms 42 and 43, suspended by the stud 44 on opposite sides of the carriage-frame. When these arms 42 and 43 are in the vertical position shown in full lines in Fig. 9, obviously no load on the hook can move it out of its carrying position; but when the arms 42 and 43 are moved into the position shown in dotted lines a load on the hook will cause it to swing downward into the position shown in dotted lines, so as to drop its load. For the purpose of producing this movement of the arms 42 and 43 a stud 84, extending between them, is connected with the rearward end of a rod 45, carrying on its forward end a buffer 46 and free to reciprocate in bearings 47 and 48 on the carriage. The buffer 46 and the arms 42 and 43 are yieldingly held forward by the spring 49. When, however, as the carriage moves forward, the buffer strikes a stationary object, it is forced backward into the position shown in dotted lines in Fig. 9, thus forcing the arms 42 and 43 also backward and permitting the hook to drop, so as to deposit its load. As soon, however, as the hook is relieved from its load the weight of the projections 32 and 33 automatically raises the hook into its normal position, where it is held by the return of the arms 42 and 43 to their normal position under the influence of the spring 49. Although the loop supporting the load may pass into the mouth of the hook by swinging the link 35 36 backward, yet after it has once passed into the mouth of the hook it cannot escape therefrom, because the link 35 36 will drop down in front of it and cannot be moved forward in consequence of the presence of the stop 38. Therefore when the hook once engages the load the load cannot escape therefrom until it is dropped by the descent of the hook into the dotted-line position of Fig. 9.

I will next describe the mechanism whereby the load is hoisted to a position for engagement with the hook 31 of the load-carriage.

A boom consisting of the side pieces 94 95, cross-pieces 96 and 97, and guide-rods 98 99 is held in an inclined position on the deck of the collier by a tie-rod 50 in such location that the guide-rods 98 and 99 are substantially parallel with the vertical plane in which the rope 14 lies, said plane being substantially midway between said guide-rods 98 99. The load (for example, coal) is contained in a bag 51, provided with loops 52, so as to be adapted to hang on the carrier 53. This carrier may consist of a single piece of metal of the form shown, having eyes 54 and 55 at opposite sides with U-shaped portions above and below. The two ends 56 and 57 overlap each other, so as to permit the loops 52 to be passed into and out of the carrier.

58 and 59 are hooks adapted to engage with the eyes 54 and 55, respectively. These hooks are suspended by hangers 60 61, respectively, provided with wheels 62 63 to run on the guide-rods 48 and 49 and with the eyes 64 65 for securing the end of the two hoist-ropes 66 and 67, both extending from the rope-drum 68 over sheaves 69 and 70, respectively, to the said eyes. When the hoist-carrier 53, with its load, has been hoisted to the top of the guide-rods 98 99, the top of the U-shaped portion 71 will strike against the rope 14. Then the carriage 13 will be advanced and the inclined surface 13ª, coming in contact with the top 71, will tilt the carrier 53 on the hooks 58 59, so as to permit the hook 31 to advance into the carrier 53 and then permit the further forward movement of the hook 31 to take the carrier 53 clear of the hooks 58 and 59. If the load be hoisted before the carriage 13 has returned from a trip to the battle-ship, the carriage 13 may by reason of its inclined surface 13ᵇ pass the hoist-carrier 53, since the portion 71 will be tilted backward sufficiently to enable the hook 31 to pass over it.

Figure 8:
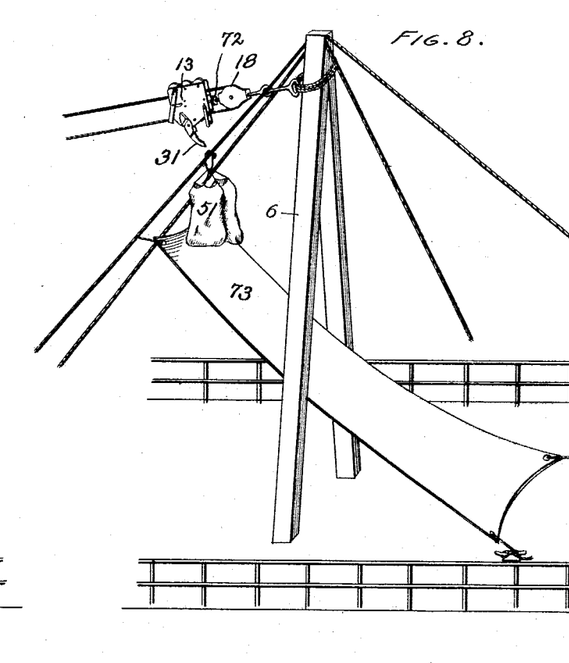

The automatic delivery of the load upon its arrival at the battle-ship may be accomplished as follows: Upon the block of the sheave 18 is mounted a buffer 72 in line to be struck by the load-carriage buffer 46. The collision between these two buffers 72 and 46 unlatches the hook 31 and permits it, as already described, to drop its load, as indicated in Fig. 8. An inclined apron 73 is so located as to catch the load as it drops and guide it where required on the battle-ship.

It is evident that other means than those shown may be employed for this purpose, and I do not, therefore, wish to be limited to the use of the particular means shown, but to be free to use any means which will accomplish this purpose.

The operation is as follows: The boat 2 is caused to tow the boat 1. Steam is turned into the rope-drum engine 12, which in its constant endeavor to haul in on the rope 10 draws the rope 14 of Fig. 15 (or the ropes 74 and 14 of Fig. 16) taut and holds it so during the whole subsequent operation. If the waves decrease the distance between the vessels, the rope-drum engine 12 takes up the slack and substantially prevents the rope 14 (or 74 and 14) from sagging. If the waves increase the distance between the vessels, the pressure of the rope-drum engine 12 will be forced to yield to the strain on the rope 10 and compelled to pay out sufficient of the rope 10 to provide sufficient rope for the increased distance. In this way the yielding pull of the rope-drum engine 12, acting in opposition to the pull of the towed boat, is constantly ready throughout the whole operation to respond to the variations in distance between the two vessels either by taking up the slack or paying out. The traction-engine 15 is run so as to move the load-carriage 13 between the head-support 5 and the boom 94 95. The load is then elevated on said boom and the traction-engine 15 started forward. The load-carriage advances so as to take the load and carry it until the buffers 46 and 72 collide, so as to allow the load to fall into the apron 73 and slide down to the deck of the vessel 2. The traction-engine 15 is then reversed, so as to carry the load-carriage back to its first position, and the operation is repeated.

Figure 15:
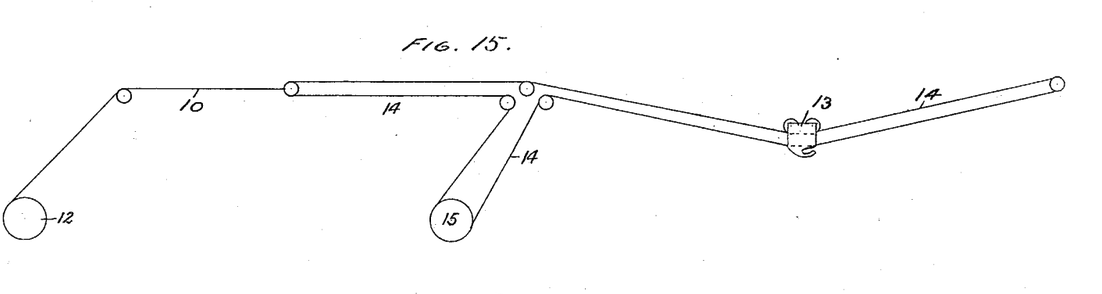
Figs. 15, 16, and 17 are diagrams of the rope courses.
Figure 16:
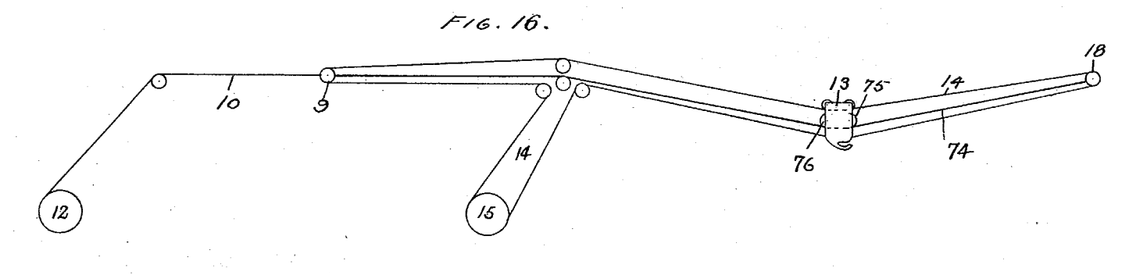
Figure 17:
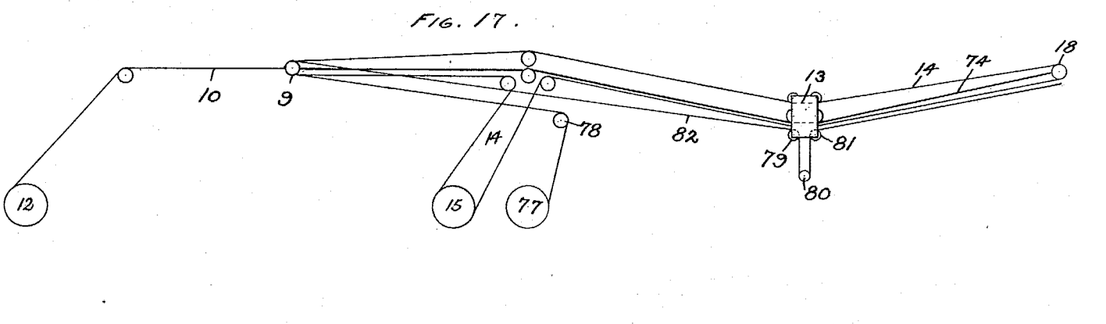
Figure 18:
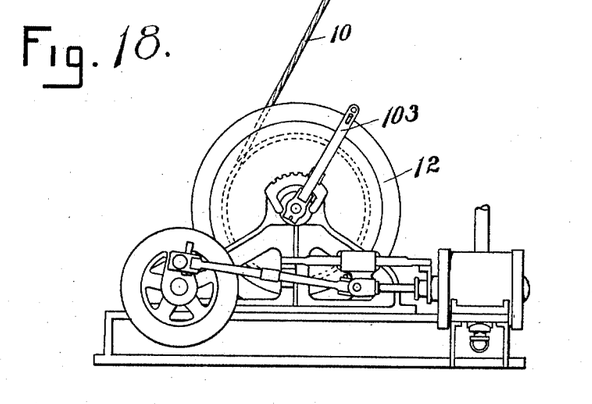
Figs. 18 and 19 represent in elevation and plan a rope-drum engine, whereby the deflection of the ropeway on the span, and consequently the elevation of the load-carriage, is controlled, and which is also adapted to automatically compensate for variations in distance between the head and tail supports of the ropeway.

The principles of my invention for cableways in general dissociated from their particular application to coaling at sea are well illustrated in Figs. 15, 16, and 17.

In Fig. 15 the course of the ropes 14 and 10 are shown the same as in Fig. 1, the rope 14 constituting the means of support as well as the means of traction for the rope.

In Fig. 16 the rope 14 still performs the traction function, but it shares the supporting function with the additional rope 74, stretched between the block of sheave 18 and the block of sheave 9, so that the drum 12 acts at the same time as a take-up or tension device for the ropes 14 and 74. In this case the wheels 75 and 76 of the load-carriage 13 rest on the rope 74, and the wheels 20 and 22 of the load-carriage rest on the upper run or branch 14, while the carriage is substantially fixed to the lower run or branch of rope 14, as before described.

In Fig. 17 there is added to the construction shown in Fig. 16 a hoisting-rope 82, which extends from the hoisting-drum 77 on the deck of the collier upward and over the sheave 78, mounted at an elevation on the collier, thence around a sheave on the same block with sheave 9, thence over a sheave 79, journaled on the load-carriage 13, thence under a fall-block sheave 80, thence over a sheave 81, journaled on load-carriage 13, and thence to the block of sheave 18, where it is made fast. Therefore with the arrangement shown in Fig. 17 the drum 12 serves as a take-up for the traction-rope 14, the supporting-rope 74, and the hoisting-rope 82.

Figure 19:
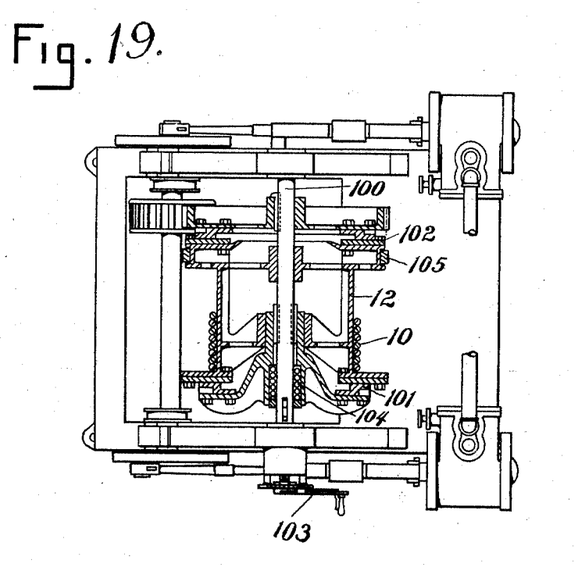

With a ropeway constructed as shown in either Figs. 15, 16, and 17 the power of the tension exerted by the drum 12 and the strength of the ropes supporting the load-carriage do not have to be increased to bear an increased load, because the increase in the weight of the load causes a greater sag of the ropeway at the carriage, so as to convey the load at a lower elevation at which the strain on the ropes and on the tension-drum 12 for the heavier load is the same as it is for the lighter load at a higher elevation. Moreover, the hoisting or lowering of the load-carriage at any point of the span may be accomplished by winding in or paying out at the tension-drum 12, so that the hoisting-rope (shown in Fig. 17) may be dispensed with under certain conditions of use. A suitable form of rope-drum engine for containing the drum 12 is shown in Fig. 19, wherein the drum is revolubly loose upon the driven shaft 100, to which shaft are revolubly fixed the clutch members 101 and 102, adapted to be clamped against opposite ends of the drum by the movement of the lever 103, acting through spring 104, so as to exert any degree of driving friction upon the drum that may be desired. In coaling at sea the shaft 100 being constantly driven by the steam-engine shown the pressure of the steam may be adjusted so as to be sufficient to take up any slack in the ropeway produced by the movement of the vessels toward each other, but at the same time insufficient for the production of any such excessive tension as would be liable to break any of the ropes, or the same effect may be produced by adjusting the power of the friction. The friction may also be set at such a degree as to maintain a substantially constant degree of deflection in the ropeway for a given load at the load-carriage. This drum is also provided with a brake 105, whereby it is controlled when the clutch is disengaged. The friction-surfaces are preferably made of metal and of the form shown to prevent undue heating under excessive slipping, such as might be produced in coaling at sea. In the construction shown in Figs. 16 and 17 the addition of the supporting-rope 74, controlled by the same device as the traction-rope 14, distributes the burden of supporting the loaded carriage between the supporting-rope 74 and the traction-rope 14, so that, if desired, smaller or less powerful ropes may be employed.

In the particular form of my invention shown in the accompanying drawings the upper portion of the rope 14 acts as the track for the wheels 20, 21, and 22, and the lower portion supplies the traction-power by its yielding engagement with the carriage, and the wheels are correspondingly arranged above the clutch. This arrangement, however, is not essential, since it is only desirable that one portion of the rope 14 (be it the upper or lower) acts as the track and that the other portion (be it the lower or upper) acts as the traction member.

Again, although I have shown only a single load-carriage, which remains continuously mounted upon the rope 14, I do not wish to limit myself to the employment of the same, providing that the load-carriage, whether a unit or divided up into sections, be adapted for carrying the load as and when required.

Again, although I have described the lower portion of rope 14 as applying the traction-power for returning the load-carriage after delivering the load I do not wish to limit myself to this method of return, since it is obvious that the carriage might make engagement with either portion of the rope 14 for its return, depending upon the direction in which the rope 14 was running.

Again, the elevated support on the collier, which sustains the sheave-blocks 16, 17, and 19 and the cable 7, is shown as an upright 5, erected between the foremast and the bow. The reason of employing this special structure 5 as an elevated support on the collier is because the foremast in the boat shown happens to be located so far back from the bow as to make it desirable to have the elevated support nearer the bow than is the foremast. I do not, however, limit myself to the use of any special structure for such elevated support, since any elevated support which is located reasonably near the bow may be utilized.

In this application Fig. 17 is only covered generically, no claim being made to its specific features.

In my applications serially numbered 45,233, 45,432, 55,862, 70,204, and 85,056 I have shown and specifically claimed various forms of apparatus which, though not specifically claimed herein, contain principles of this invention and come within the scope of the claims hereof.

Having thus fully described my invention, I claim as new and desire to secure by Letters Patent—

1. In a ropeway, in combination, a supporting-rope, a traction-rope and unitary means for controlling the tension on both of said ropes.

2. In a ropeway, in combination, a traction-rope containing an outward and an inward run, means for actuating the same in opposite directions, a movable guide in a loop of the same, a tension device controlling the position of said guide and a load-carriage engaging both the outward and inward runs of said traction-rope.

3. In a ropeway, in combination, a supporting-rope, a traction-rope having an outward and inward run and unitary means for controlling the tension on both of said ropes.

4. In a ropeway, in combination, a supporting-rope, a traction-rope, a load-carriage supported by both of said ropes and unitary means for controlling the tension on both of said ropes.

5. In a ropeway, in combination, a traction-rope, having an outward and an inward run, a movable guide in a loop of said traction-rope, a tension device controlling the position of said guide and a carriage provided with a wheel running on top of one of said runs and with means engaging the other of said runs.

6. In a ropeway, in combination, a supporting-rope, a traction-rope having an outward and an inward run, unitary means for controlling the tension on both of said ropes and a load-carriage provided with a wheel running on each of said ropes.

7. In combination, two supports having relative to-and-fro movement, a supporting-rope, a tension device connected therewith, a load-carriage, a traction-rope, means for propelling said traction-rope and connections whereby the tension on said traction-rope is maintained.

8. In combination, a boat, an elevated support thereon, a traction-rope extending to said support from another support located off of said boat and back again, a load-carriage having a yielding traction engagement with said rope, a trackway-rope for said carriage and means whereby the slack of both said ropes due to the motions of said boat is taken up, substantially as described.

9. In combination, two supports having relative to-and-fro movement, a supporting-rope, a traction-rope having an inward and outward run, a tension device and a load-carriage having running engagement respectively with said supporting-rope and one run of said traction-rope and having a traction engagement with the other run of said traction-rope.

10. In a conveying apparatus, in combination, two relatively movable supports, a load-carriage, a trackway for the same between said supports, a traction-rope and unitary means for controlling the tension on said trackway and traction-rope.

11. In a conveying apparatus, in combination, two relatively movable supports, a load-carriage, a trackway for the same between said supports, a traction-rope and a rope-drum whereby the tension of both said trackway and traction-rope is controlled.

12. In combination, a towing-boat, a towed boat, a non-traveling rope and a traveling rope between said boats, and yielding mechanism whereby a strain is exerted upon said non-traveling rope in opposition to the pull of said towed boat.

13. In combination, a towing-boat, a towed boat, a non-traveling rope and a traveling rope between said boats and a yielding mechanism whereby a strain is exerted upon both of said ropes in opposition to the pull of said towed boat.

14. In combination, a towing-boat, a towed boat, a trackway and a traveling rope between them and a yielding mechanism whereby a strain is exerted upon said trackway and said traveling rope in opposition to the pull of said towed boat.

15. In combination, two supports having relative to-and-fro motion, a load-carriage, a traction-rope for the same, a load-carriage-supporting rope and a rope-drum whereby said load-carriage-supporting rope is held under tension.

16. In a ropeway, in combination, a supporting-rope, a traction-rope having two runs across the span and a load-carriage, the weight of which is shared by said supporting-rope and both runs of said traction-rope.

17. In a conveying apparatus two relatively movable supports, a ropeway connecting said supports and comprising an endless traction-rope extending between said supports, a carriage secured to one run of said traction-rope, and a slack-adjusting device connected with the other run of the traction-rope.

18. In a conveying apparatus two relatively movable supports, a trackway connecting said supports and adjustable in length to accommodate it to the movements of the supports, a traction-rope extending from one support to the other support and back, a carriage movable on the trackway and connected with one run of the traction-rope and a slack-adjusting device connected with the other run of the traction-rope.

19. In combination two relatively moving supports, a traction-rope extending from one support to the other and back again, a load-carrier having a traction engagement with one run of said rope, and a running engagement with the other run of rope, a load-elevator whereby the load is presented to said load-carrier, a drum whereby motion is communicated to said traction-rope, and a drum whereby said rope is held under tension, said tension-drum engaging that run of the traction-rope which has a running engagement with the load-carrier whereby the position and movement of the load-carrier are controlled to accurately lay hold of the load presented by said elevator.

20. In combination, two boats 1 and 2, a traction-rope extending from a drum over an elevated sheave on boat 1 to and around an elevated sheave on boat 2, thence back again over an elevated sheave on boat 1 to said drum, a take-up sheave engaging with said rope and means on said boat 1 connected with said take-up sheave whereby the position of the same is automatically controlled.

21. In a ropeway, in combination, a load-carriage, non-traveling and traveling ropes both extending across the span and a rope-drum engine whereby the slack of said non-traveling rope is automatically taken up.

22. In a conveying-apparatus carriage, in combination, a pivoted load-supporting prong, a counterweight whereby the same is held normally raised when unloaded, and a latch whereby the same is held raised when loaded.

23. In combination, two boats 1 and 2, a load-carriage, a traction-rope extending from the load-carriage around an elevated sheave on boat 2, thence over an elevated sheave on boat 1, thence around a movable pulley to a rope-drum and a take-up rope extending from said movable pulley over another elevated sheave on boat 1.

24. In combination, the two masts of a boat, a rope extending from between said masts to a support located off of said boat, a movable pulley over which said rope passes between said masts, a rope extending from said pulley to one of said masts, a take-up mechanism for the same and a support on the other of said masts for said first-mentioned rope.

25. In combination, two relatively moving supports, a traction-rope extending from one support to the other and back again, a load-carrier, a trackway-rope for said carrier and means whereby the slack of both said ropes due to the relative movement of said supports is taken up.

26. In combination, two relatively moving supports, a traction-rope extending from one support to the other, means whereby the slack of said rope due to the relative motion of said supports is taken up, a load-carriage, a movable load-supporting finger on said carriage, mechanism whereby said finger is released to drop the load by collision with an abutment connected with one of said supports and a yielding traction engagement between said carriage and said traction-rope, whereby undue violence of collision is prevented due to the combined relative movement of the supports and traction movement.

27. In combination, two supports having relative to-and-fro movement, a substantially endless traction-rope between them, a movable guide in a loop of said rope, a tension device controlling the position of said guide and a traction-actuator engaging said rope.

28. In combination, two boats, elevated supports upon the same, a substantially endless traction-rope extending between said supports and forming a plurality of loops, a sheave 18 engaging one of said loops, a traction-motor 15 engaging another of said loops, a sheave 9 engaging a third of said loops and means whereby tension is applied to said rope through said sheave 9.

29. In combination, two supports having relative to-and-fro movement, a supporting-rope, a rope-drum maintaining tension thereon, a load-carriage having a running engagement with said supporting-rope, a traction-rope, a traction-rope actuator, and connections whereby the tension upon said traction-rope is maintained.

30. In combination, two supports having relative to-and-fro movement, a supporting-rope, means for maintaining tension thereon, a load-carriage having a running traction engagement with said supporting-rope, a traction-rope having an outward run and an inward run, a traction-rope actuator connected with one run, a take-up connected with the other run, and means on the load-carriage forming a yielding traction engagement with one run of said traction-rope.

31. In combination, a towing-boat, a towed boat, a non-traveling rope and a traveling rope between said boats and a rope-drum whereby strain is exerted upon said non-traveling rope in opposition to the pull of said towed boat.

32. In a conveyer device adapted to be operated between supports of a variable separation, a ropeway mechanism containing a non-traveling rope, a traveling rope, yielding strain-supporting members for both of said ropes, and means for actuating the traveling rope without affecting the action of the said strain-supporting members.

33. In a ropeway, in combination, a load-carriage, a rope participating both in its traction and support, a movable pulley in a loop of said rope, winding mechanism controlled by a slipping engagement and a rope whereby the tension of said slipping engagement is applied to said movable pulley.

34. In a cableway, the combination with a supporting-rope, a load-carriage running on said rope, an endless hauling-rope having both runs engaging the carriage to assist in supporting it and a tension device acting continuously upon the hauling-rope.

35. In a ropeway, in combination, an endless rope, a load-carriage fixed to one run of said rope and supported upon the other run thereof, a traction mechanism for the same and tension mechanism whereby the deflection of the same under the load is controlled.

Signed at Washington, in the District of Columbia, this 18th day of June, A. D. 1898.

THOMAS SPENCER MILLER.

Witnesses:
 HERBERT E. TREADWELL,
 GEO. W. POE.